Feb. 13, 1945.   P. T. SMITH   2,369,319
GAUGE
Filed May 31, 1943
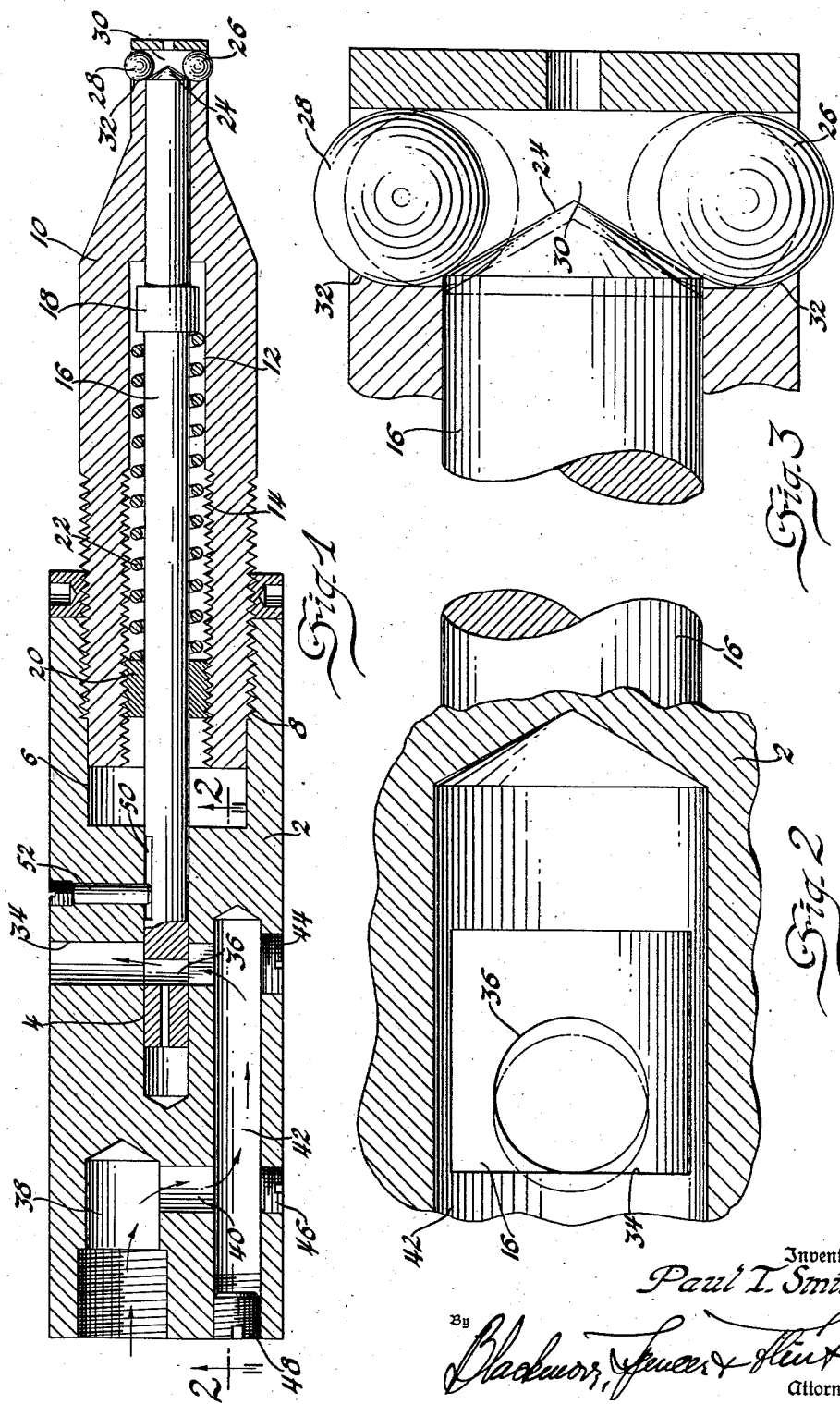
Inventor
Paul T. Smith
By
Blackmore, Spencer & Flint
Attorneys Patented Feb. 13, 1945

2,369,319

UNITED STATES PATENT OFFICE 2,369,319

GAUGE

Paul T. Smith, Saginaw, Mich., assignor to General Motors Corporation, Detroit, Mich., a corporation of Delaware Application May 31, 1943, Serial No. 489,140

7 Claims. (Cl. 33—178)

This invention relates to measuring and testing apparatus and more specifically to that type of measuring apparatus operating on the principle of leakage of air for determining distances or dimensions. There have been in use for some time air gauges which operate on the principle of air leakage from a testing or checking nozzle which is placed in juxtaposition to the piece to be tested. The amount of air which leaks or is emitted from openings in the nozzle, and through the opening remaining between the piece to be checked and the nozzle, is a measure of the dimension. Such a testing mechanism is shown and described in a copending application, Ser. No. 408,047, filed August 23, 1941, in the name of Fred Rupley, and entitled "Air gauge." In that instance, however, the nozzle or projecting portion having the openings therein through which air is caused to leak is rigidly secured to a casting upon which the meter which measures the pressure within the housing is mounted. In other words, this mechanism is designed to be placed upon a bench or other support and the piece to be tested there then carried or brought to the bench, and if the dimension to be checked is of internal diameter, placed over the test nozzle and the reading on the dial checked.

There are many instances in which it would be more desirable to be able to move the test nozzle or bring it to the means to be tested or checked, such, for example, as a large casting in which there are openings of a certain diameter and in that case it would be physically impossible to carry the casting to the relatively fixed checking nozzle.

Also in the previous case the openings from which the air is permitted to escape are brought into close proximity with the part to be tested and air escapes between the test part and the nozzle. Under certain circumstances it would be advisable not to have the air flowing at this checking point but rather have the checking point control the flow of air at a remote position not in actual contact with the test part.

It is, therefore, an object of my invention to provide a portable testing or checking nozzle.

It is a further object of my invention to provide a portable checking nozzle which may be connected to a remote indicating means.

It is a further object of my invention to provide a checking nozzle in which the variable fluid escape port is remotely controlled.

It is a further object of my invention to provide a portable checking nozzle in which the variable opening through which the fluid escapes is not adjacent the surface being tested, but is remotely controlled from parts contacting that surface which avoid errors introduced by rough surfaces and abnormal conditions.

It is a still further object of my invention to provide a portable checking nozzle that may be utilized over a considerable distance for dimensioning purposes.

With these and other objects in view which will become apparent as the specification proceeds, the embodiments of my invention will be best understood by reference to the following specification and claims and the illustrations in the accompanying drawing, in which:

Figure 1 is a transverse sectional view through a device embodying my invention.

Figure 2 is an enlarged partial sectional view taken substantially on lines 2—2 of Figure 1.

Figure 3 is an enlarged sectional view showing the engaging tip of the measuring nozzle.

Referring now more specifically to the drawing, a casing or housing 2 is provided which has a substantially center bore 4 extending for a considerable distance through the center thereof. The outer end of this bore is enlarged as shown at 6 in Figure 1 and the interior portion thereof is threaded as shown at 8 to carry a nozzle 10 which may be screw-threaded into this hollow portion and which in turn has a central bore 12 therein. The inward or rear portion of the internal bore 12 is larger than the outer portion and threaded as shown at 14. A longitudinal shaft 16 extends through the central opening 12 in the nozzle 10 and also back through the central bore 4 of the main casing 2 which is in alignment therewith. Slightly back from the forward end of this shaft 16 is a fixed collar 18. A cylindrical slidable collar 20 having its exterior surface threaded is mounted on the approximate center of the shaft 16 and screwed into the threaded opening 14 in the nozzle to compress between its inner surface and the forward collar 18 a compression spring 22 which therefore biases the shaft 16 toward its outward position, which in Figure 1 is toward the right.

The outer end of the shaft 16 has a tapered or conical nose 24 which is adapted to engage a pair of ball bearings 26 and 28 supported in a transverse slot 30 in the end of the nozzle. As best shown in Figure 3, a portion of this transverse slot 30 is curved as shown at 32 on each side to prevent these balls from being ejected from this slot when the shaft 16 is forced to the right. They are therefore maintained securely against this portion 32 and against the front portion of the slot.

A transverse channel 34 is provided in the approximate center of the casing 2 and intersects the bore 4 which carries the rear end of the reciprocatory shaft 16. This shaft 16 has a diametrical opening 36 therein having a diameter smaller than the transverse duct 34 and in rest position substantially in alignment therewith. Therefore as the shaft 16 is reciprocated, the two openings will move out of alignment and vary the flow of air or other fluid through this duct 34, depending upon the position of the shaft 16. These two openings therefore by their amount of eccentricity act as a valve to control the flow of fluid therethrough.

In the rear portion of the casing 2 is an opening 38 to which it is intended to secure one end of a source of fluid pressure such as an air hose, the opposite end of which may be connected to the indicating gauging means (not shown). This opening 38 is connected to a second transverse duct 40 which in turn is connected to a longitudinal duct 42 which terminates in the transverse duct 34 formerly described. A series of threaded cap screws 44, 46 and 48 are provided in the ends of these ducts to close the same, permitting access for cleaning if necessary. One side of the reciprocable shaft 16 has a keyway or flattened portion 50 cut therein into which projects a pin 52 threadedly secured in the casing 2 to act as a lock to prevent rotation of the reciprocable shaft and to act as a limit stop for movement in the axial directions.

Therefore in the operation of this device the opening 38 is connected to the flexible hose of any desired length, which, as before stated, extends to the actual gauge or pressure indicator and the fluid pressure applied. The nozzle 10 is then inserted into the opening which it is desired to check in the same manner that a plug gauge would be used, which action causes the two balls 26 and 28 to be forced inwardly, which in turn causes the shaft 16 to be pushed to the rear or toward the left. This moves the opening 36 out of alignment with the opening 34 and therefore reduces the size of the opening through which the air can flow along the path shown by the arrows. This is illustrated by the dotted line position in Figure 2. Thus the smaller the diameter the more the balls 26 and 28 will be forced inwardly and the farther the shaft 16 will be forced to the left to cut off air from escaping through duct 34. The actual position of the balls 26 and 28 within the diameter is not important, it only being necessary to set the gauging means or indicator to a definite position initially before gauging a series of pieces of the same configuration or dimension. Then if by inserting the nozzle into the openings being checked the indicating needle comes within limitations of variation from the original mark, the piece is acceptable.

For different diameters of course different nozzles would have to be inserted into the end of the casing 2. The length of the end of the nozzle of course would also vary, depending upon the depth of the opening which it is necessary to check. It is desired to point out that in this construction the fluid does not leak or escape to the atmosphere at a location between the nozzle and the part being gauged as in prior apparatus, but rather through a vent in the casing 2, the flow through which is controlled through the position of shaft 16 as determined by the floating ball location within the part. No air or fluid therefore flows within the part and any errors that might be introduced into the reading by excess air escaping through rough spots or abnormal conditions is avoided. The fluid or air escaping through vent 34 is directly proportional to the exact dimension across the outer surface of the two balls 26 and 28. Any abnormal conditions may be measured by rotating the test unit within the bore being measured and if any variation in the reading of the gauge is observed, the bore is not truly circular.

I claim:

1. In a portable gauging device, a casing, longitudinally reciprocable means within the casing, said casing and reciprocable means having alignable openings for fluid flow therethrough whereby any relative motion between them causes a valve action to alter said fluid flow and radially movable means in said casing to cause reciprocation of the longitudinal means.

2. In a portable gauging device, a casing, longitudinally reciprocable means mounted within the casing, said casing and reciprocable means having alignable openings for fluid flow therethrough whereby any relative motion between them causes a valve action to control said fluid flow and radially movable means carried by the casing extending beyond the surface thereof adapted to engage surfaces to be gauged, radial movement of which causes reciprocation of the reciprocable means.

3. In a portable gauging device, an elongated cylindrical casing having an axial opening therethrough for a substantial portion of its length intersected by a transverse opening, a reciprocable member carried in the opening and having an opening therethrough which is adapted to register with the transverse opening in the casing and radially movable means to cause said means to reciprocate and vary the registering opening area.

4. In gauging means, an elongated casing having a longitudinal bore therethrough for a substantial portion of its length intersected by a transverse bore, said longitudinal bore being of different diameters, a hollow nose piece secured in the longitudinal bore, a reciprocable shaft carried by the longitudianl bore and the nose, said shaft having an opening therethrough adapted to align with the transverse casing bore whereby the two act as a valve, means for applying fluid pressure to the transverse bore and means to reciprocate the shaft in accordance with a size to be gauged.

5. In gauging means, an elongated casing having a longitudinal bore therethrough for a substantial portion of its length intersected by a transverse bore, said longitudinal bore being of different diameters, a hollow nose piece secured in the longitudinal bore, a reciprocable shaft carried by the longitudinal bore and the nose, said shaft having an opening therethrough adapted to align with the transverse casing bore whereby the two act as a valve, means for applying fluid pressure to the transverse bore, resilient biasing means to bias the shaft toward one extremity and means acting to compress the biasing means to reciprocate the shaft movable in accordance with a dimension to be measured mounted in the nose piece.

6. In gauging means, an elongated casing having a longitudinal bore therethrough for a substantial portion of its length intersected by a transverse bore, said longitudinal bore being of different diameters, a hollow nose piece secured in the longitudinal bore, a reciprocable shaft carried by the longitudinal bore and the nose, said shaft having an opening therethrough adapted to align with the transverse casing bore whereby the two act as a valve, means for applying fluid pressure to the transverse bore, biasing means to bias said shaft toward one extremity, radially movable members mounted in the nose adjacent the shaft end, said latter having a tapered section whereby upon radial movement of the means the shaft will be reciprocated.

7. In gauging means, an elongated casing having a longitudinal bore therethrough for a substantial portion of its length intersected by a transverse bore, said longitudinal bore being of different diameters, a hollow nose piece secured in the longitudinal bore, a reciprocable shaft carried by the longitudinal bore and the nose, said shaft having an opening therethrough adapted to align with the transverse casing bore whereby the two act as a valve, means for applying fluid pressure to the transverse bore, biasing means to bias said shaft toward one extremity, radially movable members mounted in the nose adjacent the shaft end, said latter having a tapered section whereby upon radial movement of the means the shaft will be reciprocated, said radially movable members having a portion extending beyond the casing surface to directly engage the surface to be measured.

PAUL T. SMITH.